Figure 1:
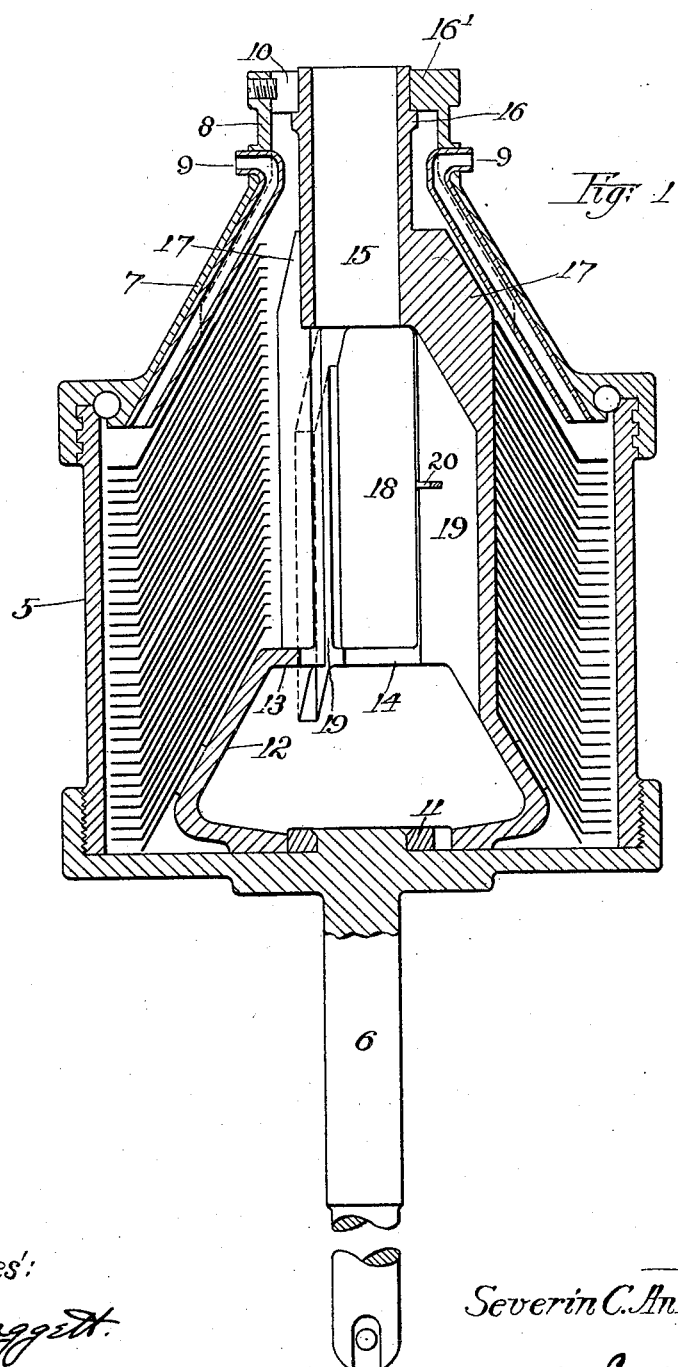

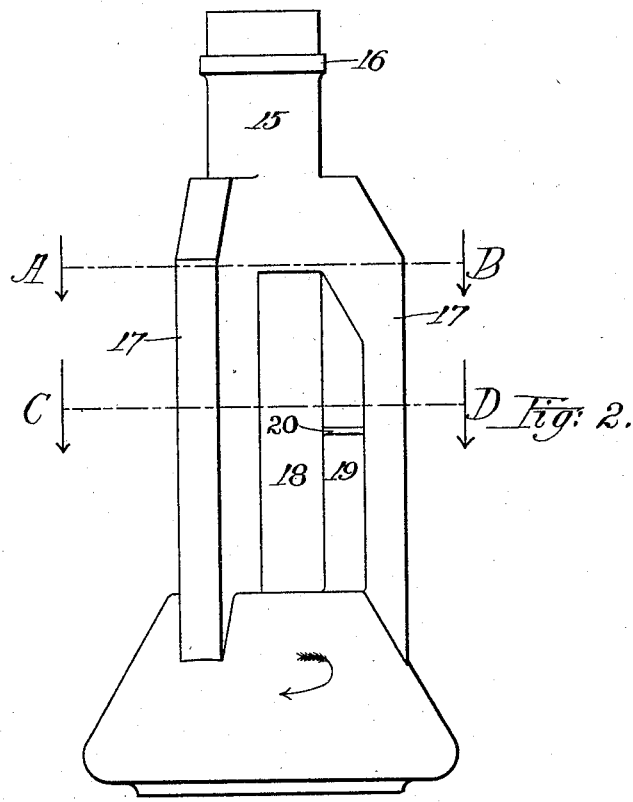
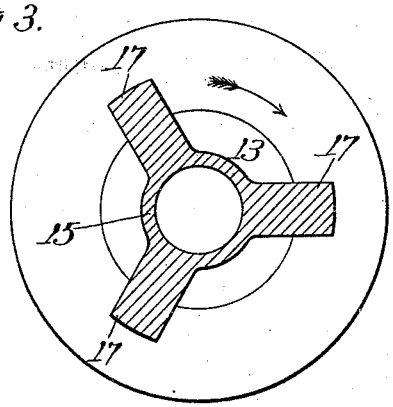
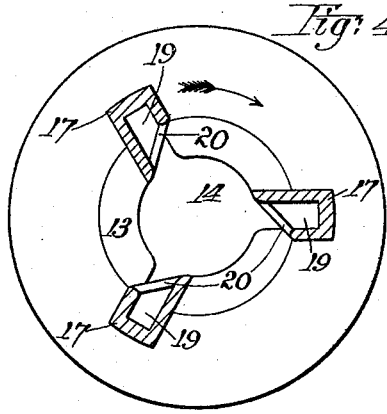

UNITED STATES PATENT OFFICE.

SEVERIN C. ANKER-HOLTH, OF RIVERSIDE, ILLINOIS, ASSIGNOR TO INTERNATIONAL HARVESTER COMPANY, A CORPORATION OF NEW JERSEY.

CENTRIFUGAL CREAM-SEPARATOR.

No. 795,807.  Specification of Letters Patent.  Patented Aug. 1, 1905.

Application filed March 6, 1905. Serial No. 248,616.

*To all whom it may concern:*

Be it known that I, SEVERIN C. ANKER-HOLTH, a citizen of the United States, residing at Riverside, in the county of Cook and State of Illinois, have invented certain new and useful Improvements in Centrifugal Cream-Separators, of which the following is a specification, reference being had to the accompanying drawings, forming a part thereof.

My invention relates to centrifugal cream-separators, and in particular to what are called "feed devices" for the above class of machines.

It consists in providing a feed device having an upper conducting-throat and a lower receiving-chamber connected by means of one or more ribs concentrically arranged around said throat and having interior channels provided with inwardly-directed openings for the overflow of the full-milk, the objects being to provide an improved distribution of the full-milk to the division contrivances and a resulting gain in efficiency of separation of the heavy products from the lighter. I attain these objects by the mechanism illustrated in the accompanying drawings, in which—

Figure 1 is a sectional elevation of a cream-separator bowl provided with my improved feed device. Fig. 2 is a side elevation of the feed device. Fig. 3 is a section on line A B of Fig. 2, and Fig. 4 is a section on line C D of Fig. 2.

Similar numerals refer to similar parts throughout the several views.

The bowl is supported and driven by the shaft 6 and is provided with a conical cover 7, having a contracted neck 8, having the milk-outlets 9 and the cream-outlet 10 through its side walls and top, respectively.

In its preferred form the feed device comprises a lower receiving-chamber having a central opening through its bottom adapted to fit over a boss 11, formed on the bottom of the bowl 5 for the purpose of centering the feed device with the bowl, and inwardly and upwardly converging sides 12, top portion 13, having a central opening 14, an upper conducting-throat 15, having a collar 16, with which the annular flange 16' of the top of the neck portion of the bowl 5 engages for the purpose of securing the feed-tube in place, and one or more ribs 17, concentrically arranged around said throat and opening 14 in said receiving-chamber, connects the throat with said receiving-chamber, and 18 represents the axial space between the throat and receiving-chamber through which the full-milk descends to the receiving-chamber. There is no connection between the body portions of the ribs, thus providing an unobstructed open channel therebetween communicating with the outer and axial space within the bowl. The ribs are preferably rectangular in cross-section and elongated radially. They are provided with interior channels 19, opening inward and extending from the throat downward and communicating with the receiving-chamber, the upper ends of the channels inclining inward and upward to the throat-opening. The channels may have bridges 20 across their open sides to subdivide the opening, which might be desirable if very thin sheet metal was used in their construction.

The feed device and bowl are rotated in the direction indicated by the arrows in Figs. 2, 3, and 4, and that side of each channel facing the direction of rotation is preferably shortened radially. The full-milk is delivered from a feed-tank or other source of supply into the mouth of the throat 15 and, under the force of gravity, descends through the axial space 18 between the connecting-ribs into the lower receiving-chamber and then, influenced by centrifugal force, will flow upward in the channels formed in the ribs and, overflowing their sides, will be delivered through the unobstructed channels to the division contrivances occupying the body of the bowl.

What I claim as my invention, and desire to secure by Letters Patent, is—

1. In a centrifugal cream-separator, the combination of a vertically-arranged bowl, a feed-opening extending axially from the top to the bottom thereof, one or more vertically-arranged ribs suitably supported outside said opening and leaving unobstructed open channels therebetween communicating with the outer and axial space within the bowl, said ribs having longitudinal channels opening inward.

2. In a centrifugal cream-separator, the combination of a vertically-arranged bowl, an axially-arranged feed device within said bowl comprising a receiving-throat located at the top of said bowl, one or more ribs depending therefrom outside an axial opening coincident with said throat and leaving unobstructed open channels therebetween communicating with the outer and axial space within the bowl, said ribs having longitudinal channels opening inward.

3. In a centrifugal cream-separator, the combination of a vertically-arranged bowl, an axially-arranged feed device within said bowl comprising a receiving-chamber at the bottom of the bowl, an axial opening through the top wall of said receiving-chamber, one or more ribs secured to the wall of said chamber outside said axial opening and extending upward substantially parallel with the axis of said bowl, and leaving unobstructed open channels therebetween communicating with the outer and axial space within the bowl, said ribs having longitudinal channels opening inward and communicating with said receiving-chamber.

4. In a centrifugal cream-separator, the combination of a vertically-arranged bowl, an axially-arranged feed device within said bowl comprising an upper conducting-throat, a lower receiving-chamber having an axial opening through its top wall, one or more vertically-arranged ribs connecting said throat with said receiving-chamber outside of said axial opening and leaving unobstructed open channels therebetween communicating with the outer and axial space within the bowl, said ribs having longitudinal channels opening inward and communicating with said receiving-chamber.

5. In a centrifugal cream-separator, the combination of a vertically-arranged bowl, an axially-arranged feed device within said bowl comprising an upper conducting-throat, a lower receiving-chamber having an axial opening through its top wall, one or more vertically-arranged rectangular ribs connecting said throat with said receiving-chamber outside of said axial opening and leaving unobstructed open channels therebetween communicating with the outer and axial space within the bowl, said ribs having rectangular longitudinal channels opening inward and communicating with said receiving-chamber.

6. In a centrifugal cream-separator, the combination of a vertically-arranged bowl, an axially-arranged feed device within said bowl comprising an upper conducting-throat, a lower receiving-chamber having an axial opening through its top wall, a series of radially-disposed rectangular ribs connecting said throat with said receiving-chamber outside of said axial opening and leaving unobstructed open channels therebetween communicating with the outer and axial space within the bowl, said ribs having rectangular longitudinal channels opening inward and communicating with said receiving-chamber.

7. In a centrifugal cream-separator, the combination of a vertically-arranged bowl, an axially-arranged feed device within said bowl comprising an upper conducting-throat, a lower receiving-chamber having an axial opening through its top wall, a series of radially-elongated ribs connecting said throat with said receiving-chamber outside of said axial opening and leaving unobstructed open channels therebetween communicating with the outer and axial space within the bowl, said ribs having radially-elongated inwardly-opening channels communicating with said receiving-chamber.

8. In a centrifugal cream-separator, the combination of a vertically-arranged bowl, an axially-arranged feed device within said bowl comprising an upper conducting-throat, a lower receiving-chamber having an axial opening through its top wall, one or more vertically-arranged ribs connecting said throat with said receiving-chamber outside of said axial opening and leaving unobstructed open channels therebetween communicating with the outer and axial space within the bowl, said ribs having longitudinal channels opening inward and communicating with said receiving-chamber, said channels having one side shortened radially.

9. In a centrifugal cream-separator, the combination of a vertically-arranged bowl, an axially-arranged feed device within said bowl comprising an upper conducting-throat, a lower receiving-chamber having an axial opening through its top wall, a series of vertically-arranged ribs connecting said throat with said receiving-chamber outside of said axial opening and leaving unobstructed open channels therebetween communicating with the outer and axial space within the bowl, said ribs having longitudinal channels opening inward and communicating with said receiving-chamber, said channels having the side facing the direction of rotation shortened radially.

10. In a centrifugal cream-separator, the combination of a vertically-arranged bowl, a conical cover therefor provided with a contracted neck having an inwardly-projecting annular flange at its upper end, a cream-outlet through said annular flange, skim-milk outlets through the side walls of said contracted neck, an axially-arranged feed device within said bowl having an upper tubular throat provided with a collar engaging with the annular flange of said neck, a lower receiving-chamber and means for centering it at the bottom of the bowl, said chamber having an axial opening through its top wall, a series of radially-elongated ribs connecting said throat with said receiving-chamber outside of said axial opening and leaving unobstructed open channels therebetween communicating with the outer and axial space within the bowl, said ribs having radially-elongated channels opening inward and communicating with said receiving-chamber.

In witness whereof I hereto affix my signature in presence of two witnesses.

SEVERIN C. ANKER-HOLTH.

Witnesses:
 G. W. HENDERSON,
 PETER P. VALBOE.